United States Patent
Pariseau

(10) Patent No.: US 6,579,006 B1
(45) Date of Patent: Jun. 17, 2003

(54) THERMOCHROMIC METHOD AND DEVICE FOR USE RELATIVE TO A PRODUCT CONTAINER

(76) Inventor: Blake Pariseau, 54 Marathon St., Arlington, MA (US) 02474

( * ) Notice: Subject to any disclaimer, the term of this patent is extended or adjusted under 35 U.S.C. 154(b) by 0 days.

(21) Appl. No.: 09/648,308

(22) Filed: Aug. 25, 2000

(51) Int. Cl.$^7$ .............................. G01K 1/14; G01K 1/16; A61J 9/08
(52) U.S. Cl. ..................... 374/162; 374/141; 374/150; 374/157; 116/216; 215/11.2
(58) Field of Search ................ 374/150, 162, 374/120, 141, 157; 116/216, 207, 217–219; 426/88; 215/11.2, 230; 220/201–202

(56) References Cited

U.S. PATENT DOCUMENTS

| | | | |
|---|---|---|---|
| 648,063 A | * 4/1900 | Bauman | |
| 3,701,344 A | * 10/1972 | Walls et al. | 126/388 |
| 3,782,195 A | * 1/1974 | Meek et al. | 73/343 B |
| 3,864,976 A | 2/1975 | Parker | |
| 4,019,368 A | 4/1977 | Navato | |
| 4,057,029 A | * 11/1977 | Seiter | 116/114 V |
| 4,538,926 A | * 9/1985 | Cretien | 374/150 |
| 4,554,565 A | 11/1985 | Kito et al. | |
| 4,773,718 A | 9/1988 | Weitzen et al. | |
| 4,805,188 A | * 2/1989 | Parker | 374/141 |
| 4,859,360 A | * 8/1989 | Suzuki et al. | 252/299.7 |
| 4,878,588 A | 11/1989 | Ephraim | |
| 4,933,525 A | * 6/1990 | St. Phillips | 219/10.55 E |
| 5,052,369 A | * 10/1991 | Johnson | 126/400 |
| 5,144,112 A | * 9/1992 | Wyatt et al. | 219/386 |
| 5,218,834 A | * 6/1993 | Major et al. | 374/150 |
| 5,223,958 A | 6/1993 | Berry | |
| D338,413 S | 8/1993 | Ciambella | |
| 5,282,683 A | * 2/1994 | Brett | 374/150 |
| 5,400,610 A | * 3/1995 | Macedo | 62/130 |
| 5,482,373 A | 1/1996 | Hutchinson | |
| 5,484,205 A | * 1/1996 | Grupp et al. | 374/142 |
| 5,588,747 A | 12/1996 | Blevins | |
| 5,630,959 A | * 5/1997 | Owens | 219/730 |
| 5,678,925 A | * 10/1997 | Garmaise et al. | 374/157 |
| 5,720,555 A | * 2/1998 | Elele | 374/150 |
| 5,738,442 A | * 4/1998 | Paron et al. | 374/162 |
| 5,779,364 A | * 7/1998 | Cannelongo et al. | 374/160 |
| 5,786,578 A | * 7/1998 | Christy et al. | 219/720 |
| 5,920,364 A | 7/1999 | Akins et al. | |
| 6,126,313 A | * 10/2000 | Schiller | 374/142 |

FOREIGN PATENT DOCUMENTS

| | | | | |
|---|---|---|---|---|
| GB | 0011320 | * | 9/1887 | 374/150 |
| GB | 2199981 A | * | 7/1988 | 374/162 |
| JP | 2002046762 | * | 8/2000 | A23L/3/00 |

* cited by examiner

Primary Examiner—Diego Gutierrez
Assistant Examiner—Gail Verbitsky
(74) Attorney, Agent, or Firm—O'Connell Law Firm

(57) ABSTRACT

A thermochromic device for use relative to a product container for providing a thermochromic indication of a temperature of a volume of product that is retained within an open inner volume of the container comprising a first image display and a second image display. The second image display and, possibly, the first image display could incorporate a layer of thermochromic material with an active temperature range. The active temperature range for the second image display could be above or below room temperature. The first image display can be thermochromic or non-thermochromic, and a thermochromic third image display could be provided. Where first, second, and third image displays are included, the second and third image displays could have active temperature ranges that are both above, both below, or to each side of room temperature. The image displays could be coupled to a side wall or to an upper surface of a product container. When coupled to an upper surface of a product container, the image displays can be disposed in a depression in the upper surface that dips into the product that is retained in the product container. The upper surface of the product container could be the top of a can or the lid of a cup or bowl arrangement.

19 Claims, 5 Drawing Sheets

THERMOCHROMIC METHOD AND DEVICE FOR USE RELATIVE TO A PRODUCT CONTAINER

FIELD OF THE INVENTION

The present invention relates generally to containers. More particularly, the present patent discloses and protects a method and device for use relative to a product container, such as a beverage or comestible container, that provides a thermochromic indication of a temperature of a volume of product that is retained within an open inner volume of the product container and increases the effective display surface of the product container by exploiting a single surface region to display a plurality of designs.

BACKGROUND OF THE INVENTION

One knowledgeable in the art of containers, particularly beverage and comestible containers, will be well aware that a plurality of methods and devices have been disclosed for providing an indication of a temperature condition of a volume of material, typically liquid, that is retained within an open inner volume of the container. Of course, these methods and devices are intended to apprise a prospective consumer of the approximate or exact temperature condition of the retained liquid so that the user can rely and act thereon. For example, certain of these inventions can indicate to a user the overall temperature condition of a retained liquid, such as hot or cold. With this, for example, a user simply desiring a cold liquid can ensure that the liquid is cold and a user simply desiring a hot liquid can ensure that the liquid is hot. Other types of temperature indicating devices have been disclosed for providing a more exacting indication of temperature, such as an exact temperature of the retained liquid or in which temperature range of a plurality of small (i.e., 2–5 degree) temperature ranges the retained liquid resides.

Many of these prior art devices employ thermochromic liquid crystal mesophase material, which as its name suggests exhibits a change in color in response to a change in temperature. Stated more particularly, thermochromic liquid crystal mesophase materials have predetermined active temperature ranges in which they change color to indicate that they are in that predetermined active temperature range. Since the active temperature range of thermochromic liquid crystal material can be calibrated to suit particular requirements or desires, temperature indicating devices have been created with selected "hot" and "cold" temperature ranges or selected individual temperature ranges.

Thermochromic liquid crystal mesophase materials technically pass through all colors of the visible spectrum in sequence as the material's temperature is varied through its predetermined active temperature range. However, three colors typically predominate: a brownish-red color will be followed by a green color that leads to a blue color. Outside its active temperature range in either direction, standard liquid crystal mesophase material appears as black against a black background. Exploiting this, prior art devices have interposed black numeric characters representative of the material's active temperature range between a transparent protective layer and the liquid crystal material. With this, the numeric characters will become apparent only when the liquid crystal material is in its active temperature range.

Employing this technique, devices of the prior art have created strips with a plurality of sequentially calibrated thermochromic liquid crystal events, each with a respective numeric temperature indication. These strips have been adhered to the external surfaces of containers, such as beverage containers, by adhesive or the like. With this, the heat condition of a volume of liquid retained in the container will be conducted to the strip of thermochromic liquid crystal events. This, in turn, will cause the liquid crystal event corresponding to the temperature of the contained liquid to enter its active temperature range thereby revealing the otherwise obscured numeric characters. With this, the temperature of the contained liquid will be depicted.

These prior art devices certainly have provided useful contributions to the present state of the art. However, they do typically suffer from a number of disadvantages. For example, by occupying a sizable portion of the surface are of the beverage container, they necessarily detract from the surface area available for advertising, relaying product background information, and similar purposes. Furthermore, devices of the prior art typically have merely relayed the general or particular temperature condition of a retained liquid without improving the appearance and advertising characteristics of the container. Indeed, the utilitarian nature of prior art temperature indicating devices have commonly detracted from the aesthetics of the beverage container relative to which they are employed. Still further, since many prior art devices have been designed to be affixed to a beverage or other product container after its construction, it is likely that application of the devices to the surface area of the container would obscure advertising or product information on the actual surface of the container.

In light of the foregoing, one will appreciate that, notwithstanding the plurality of temperature indicating devices that have been disclosed by the prior art, there remains a need for a thermochromic device for use relative to a product container that exploits thermochromic materials not only to exploit fully the available surface area of the product container but actually to increase the effectively available surface area of the container without requiring a concomitant increase in the actual surface area.

SUMMARY OF THE INVENTION

Advantageously, the present invention is founded on the basic object of providing a thermochromic device and method for use with a product container, such as a can or the like, that incorporates thermochromic material to increase the effective surface area of the product container with which the device is used.

An underlying object of the invention is to provide a thermochromic device and method that allows the display of a plurality of different temperature-dependent images on a single surface region of the product container. Stated alternatively, the present invention sets about providing, for example, a thermochromic device and method that is capable of displaying a plurality of images on a single surface region, each over an ideally unique temperature range.

A further object of the invention is to provide such a device and method that can be formed integrally with a product container or fixedly or removably coupled thereto.

Yet another object of the invention is to enhance the safety of users of certain product containers by apprising the user of the temperature condition of the retained product.

A related object of the invention is to provide a thermochromic device and method that adds to a user's overall enjoyment of a retained product by indicating to the user whether the retained product is in a desired temperature condition.

In certain embodiments of the thermochromic device and method, a further object of the invention is to provide an indication of the temperature condition of a retained product on a cap, lid, or other upper surface of a product container whereby consumers of potentially hot liquids or comestibles, such as coffee, tea, or soup, will be made aware of whether the liquid or comestible is in a dangerously hot condition, an ideal temperature condition for consumption, or an unsatisfactorily cold condition.

A still further object of certain embodiments of the invention is to provide thermochromic indications of the temperature condition of a retained product not only on a side surface of a product container but also on an upper surface of the product container.

Of course, additional objects and advantages of the present invention will be obvious both to one who reads this specification and reviews the accompanying drawings and to one who has an opportunity to make use of an embodiment of the invention.

In accomplishing the aforementioned objects, a most basic embodiment of the invention comprises a thermochromic device and method for use relative to product containers that provides thermochromic indication of a temperature of a volume of product that is retained within an open inner volume of the container while increasing the effective display surface of the container by exploiting a single surface region to display a plurality of designs. The thermochromic device and method essentially comprises a substrate layer with an image display region, a first image display overlying the image display region of the substrate layer, and a second image display overlapping with the first image display and overlying the image display region of the substrate layer. At least one of the first and second image displays under the invention comprises a thermochromic image display with an active temperature range over which the thermochromic image display becomes apparent.

With this, where the first image display is non-thermochromic, the thermochromic device, and thus a product container to which it is applied, will display the first image display when the thermochromic device is outside the active temperature range of the second, thermochromic image display. The thermochromic device, and thus the product container in general, will display the second image display when the thermochromic device is within the second image display's active temperature range.

When the thermochromic second image display becomes visible and active by entering its active temperature range, it could entirely obscure the first image display. Alternatively, upon becoming active and visible, the thermochromic second image display could interact with the first image display to supplement or modify the first image display. It is also within the scope of the invention for there to be third or further image displays, which also can be thermochromic. A third image display could have an active temperature range that overlaps the active temperature range of the second, and possibly other, thermochromic image displays. Alternatively, the active temperature range of the third image display could be entirely disparate from the active temperature range of all other thermochromic image displays. The third image display could entirely obscure the first and second image displays, or it could modify or supplement one or both other image displays. In any case, the active temperature ranges for the thermochromic image displays could be calibrated to cause the thermochromic image displays to become active over a given temperature range below a selected temperature or over a given temperature range in excess of a selected temperature.

The substrate layer to which the image displays are applied could comprise a layer of sheet material that could be affixed to a surface of a product container. For example, the substrate layer could comprise a sheet of paper material or a sheet of plastic or MYLAR material. Where a layer of sheet material is employed, an adhesive backing may be applied to a first surface thereof for affixing the layer of sheet material to a product container and the image displays may be applied to the second, opposite surface of the layer of sheet material. By way of reference, one may note that MYLAR material is available from the Minnesota Mining and Manufacturing Company ("3M Company") of St. Paul, Minn. In lieu of adhesive, the sheet material could be retained on the product container by being tightly wound therearound. Alternatively, the substrate layer could comprise the actual surface of the material container whereby the image displays would be applied directly thereon.

In certain embodiments, a thermochromic device can be applied most uniquely to an upper surface of a container. Again, the container could be a beverage container for retaining a beverage product. However, it must be clear that the container could just as well retain any type of comestible product including soup and the like. With this, a prospective consumer could be informed of the temperature condition of the retained product without a need for lifting the container. With this, determining the product's temperature condition certainly would be more convenient. Furthermore, the possibility of unnecessarily tilting or spilling the product would be eliminated. In certain still more unique embodiments, the thermochromic device at the upper surface of the container could be supplemented by a thermochromic device applied to a side surface of the container. With this, a user could discern the temperature condition of a retained product both from a side view and from a top view.

Relative to can-type containers, such as a typical beverage container, a thermochromic device applied to the upper surface of the container can be fixed to or directly applied to the metallic can top. Also, since beverages served in cans typically are ideally served cold, the thermochromic device in such cases will likely enter its active temperature range well below room temperature. For example, the device may be calibrated to enter its active temperature range below 45 degrees Fahrenheit.

One will appreciate, however, that the present invention could also be embodied still more uniquely and to great advantage in a removable lid of, for example, a coffee cup, a soup bowl, or any other lidded product container. There, the thermochromic device would allow a user to determine the temperature condition of the retained product conveniently and, in doing so, would also prevent the consumer from being scalded or having his or her tongue burned by searingly hot coffee or the like.

The astute observer may appreciate that, where the thermochromic device of the present invention is employed relative to the upper surface of a container, be it in a can top or in a removable lid or cap, the thermochromic device may not function accurately if consistent or constant contact is not maintained between the product and the surface to which the thermochromic material is applied. The inventor has discovered that this could be accommodated in at least two ways. One such way is to calibrate the thermochromic material to account for the lack of contact between the product and the container surface and to provide a temperature indication based on the heat transfer principles of convection and conduction from the product, to the air, to the lid or cap, and to the thermochromic device.

However, a more reliable and likely more accurate method devised by the inventor is to provide or create a depression in the lid, cap, or other upper surface of the container wherein the depression has a base that is calculated to dip into the volume of product. The thermochromic material or device could then be applied to the base of the depression whereby, assuming a sufficiently full container, constant contact between the product and the surface to which the thermochromic material is attached would be maintained. With this, the thermochromic device would be accurate in function but would be simple in structure and theory.

The image displays can certainly be formed in any one of a number of ways that would occur to one skilled in the art. For example, non-thermochromic images can be formed with any one of a variety of readily available materials including paints, inks, films, and decals. U.S. Pat. No. 5,265,532, which is incorporated herein by reference, provides a detailed description of an apparatus and method for decorating cylindrical containers. The thermochromic image displays can be formed from a variety of thermochromic materials including thermochromic liquid crystal material and thermochromic ink. One knowledgeable in the art will appreciate that typical thermochromic inks are founded on the combination of an electron-donating color forming material and an electron-accepting color developing material. Further background may be had to U.S. Pat. Nos. 4,028,118 and 4,732,810, which are incorporated herein by reference. In any case, one skilled in the art will be aware that any one of a variety of methods, such as painting, coating, spraying, dipping, marking, screen printing, offset printing, and gravure printing, will allow the plurality of image displays to be printed in an overlapping manner. The preferred thermochromic materials will be color reversible whereby the created device could be used repeatedly where appropriate.

By employing such materials, the thermochromic display images can be formed to demonstrate reversible color changes to red, purple, yellow, blue, green, orange, and a variety of intermediate colors. With this, substantially any desired display image can be created. For example, display images can provide advertising messages that become visible when the product container enters the thermochromic material's predetermined active temperature range. Alternatively, the display images can apprise a prospective consumer of the temperature condition of the retained product. Still other uses for the multiple thermochromic images will be obvious to one skilled in the art after reading this disclosure.

With a plurality of embodiments of the present invention for a modular wall component generally described, one will appreciate that the foregoing discussion broadly outlines the more important features of the invention merely to enable a better understanding of the detailed description that follows and to instill a better appreciation of the inventor's contribution to the art. Before any particular embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As is the case with many inventions, the present invention for a thermochromic device is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
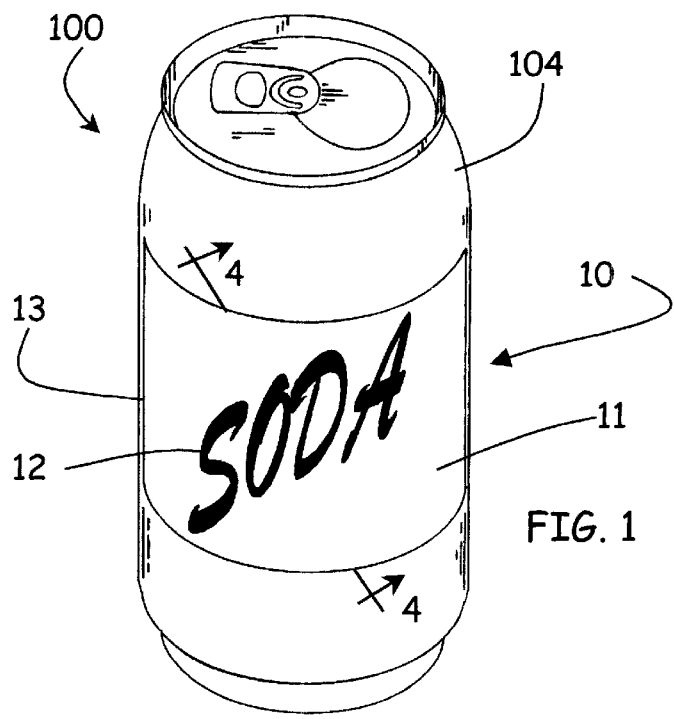
FIG. 1 is a perspective view of a thermochromic device according to the present invention employed relative to a beverage container wherein the thermochromic device is in a first temperature condition.
Figure 2:
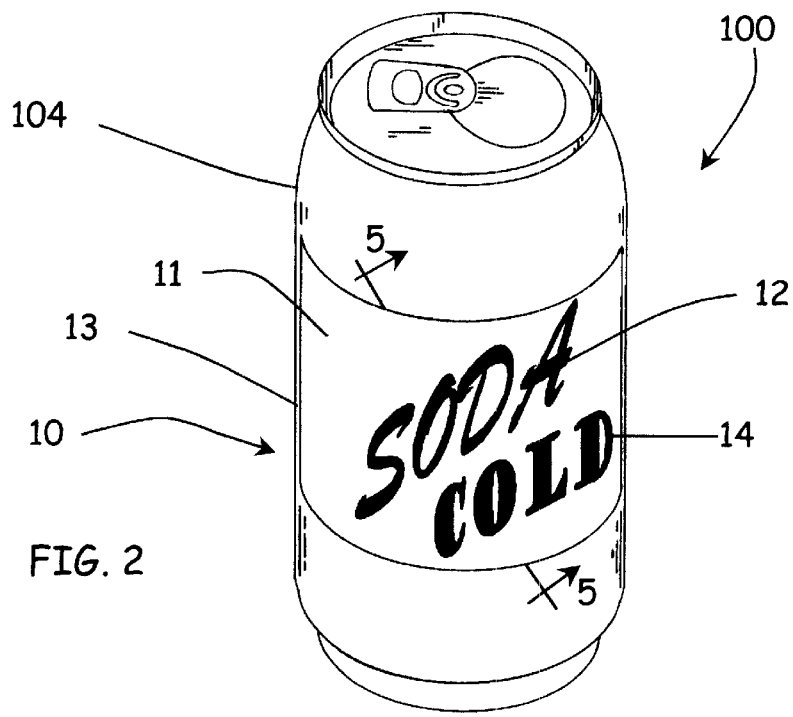
FIG. 2 is a perspective view of the thermochromic device of FIG. 1 in a second temperature condition.
Figure 3:
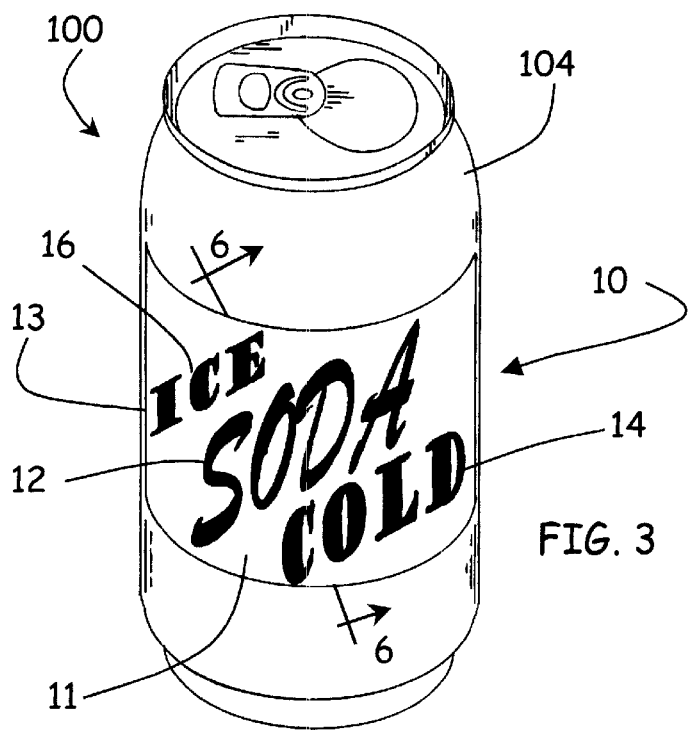
FIG. 3 is a perspective view of the thermochromic device of FIGS. 1 and 2 in a third temperature condition.
Figure 4:
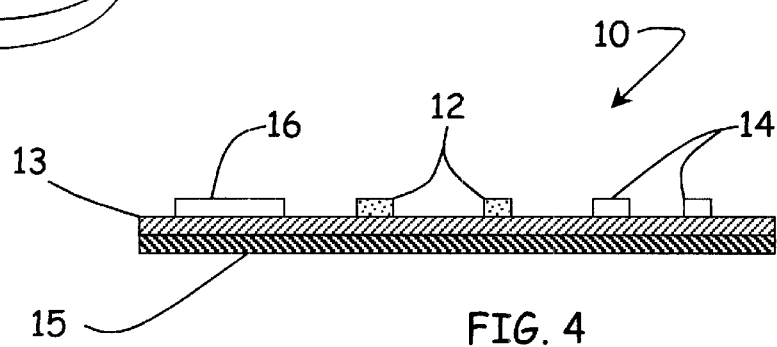
FIG. 4 is a cross sectional view of the thermochromic device of taken along the line 4—4 in FIG. 1.
Figure 5:
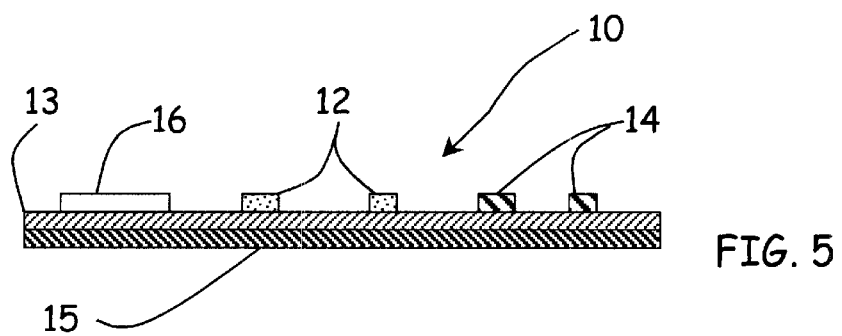
FIG. 5 is a cross sectional view of the thermochromic device taken along the line 5—5 in FIG. 2.
Figure 6:
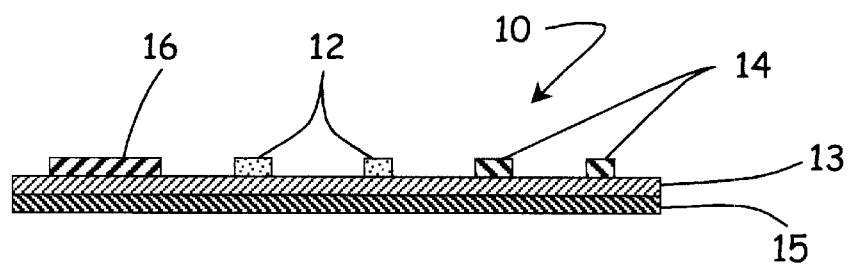
FIG. 6 is a cross sectional view of the thermochromic device taken along the line 6—6 in FIG. 3.

With this in mind and looking more particularly to the accompanying figures, an embodiment of the present invention for a thermochromic device is indicated generally at 10 in FIGS. 1, 2, and 3 where the thermochromic device 10 is shown applied to a beverage container 100. In this case, the beverage container 100 is in the form of a pop-top can of the type commonly employed for retaining soda, beer, and other liquids intended for human consumption. In FIG. 1, the beverage container 100, and thus the thermochromic device 10, is shown in a first temperature condition. FIG. 4 shows the thermochromic device 10 and the beverage container 100 in a cross section taken along the line 4—4. In FIG. 2, the beverage container 100 and the thermochromic device 10 are depicted in a second temperature condition, and they are shown in a third temperature condition in FIG. 3. FIGS. 5 and 6 show the thermochromic devices 10 and the beverage containers 100 of FIGS. 2 and 3 in cross section taken along the line 5—5 and 6—6 respectively.

Although preferred temperature conditions certainly can vary depending on a number of factors including consumers' desires and the type of beverage contained, the preferred embodiment shown in FIGS. 1-6 provides a useful example. There, the thermochromic device 10 has first, second, and third image displays 12, 14, and 16 that overly an image display region 11 of a substrate layer 13. The substrate layer 13 could comprise a layer of sheet material that could be affixed to a side wall 104 of the beverage container 100. For example, the substrate layer 13 could comprise a sheet of paper material or a sheet of plastic or MYLAR material. Where a layer of sheet material 13 is employed, an adhesive backing 15 may be applied to a surface thereof for affixing the layer of sheet material 13 to the beverage container 100. By way of reference, MYLAR material, which is available from the Minnesota Mining and Manufacturing Company ("3M Company") of St. Paul, Minn., could be used. In lieu of adhesive, the sheet material 13 could be retained on the beverage container 100 by being tightly wound therearound. Alternatively, the substrate layer 13 could comprise the actual side wall 104 of the beverage container 100.

The first image display 12, which in this case comprises a depiction of the word "SODA," is a non-thermochromic image of, for example, standard ink or the like. With this, the first image display 12 is not temperature dependent and, therefore, is always visible. The second image display 14, which is in the shape of the word "COLD," is a thermochromic image. The second image display 14 is calibrated to become active or visible over an active temperature range that is well below room temperature and that is within a preferred range for consuming the beverage but not at a lower portion of that range.

For example, one can assume for the sake of the present discussion that cold beverages are best served between 33 and 45 degrees Fahrenheit. With this, the second image display 14 could be calibrated to have an active temperature range of 33 to 45 degrees Fahrenheit. The third image display 16, which is in the shape of the word "ICE" and the shape of icicles and frost, has an active temperature range that overlaps with the active temperature range of the second image display 14 but is at a lower end thereof. For example, the third image display 16 could have an active temperature range of 33 to 40 degrees Fahrenheit. Under this arrangement, then, the first, non-thermochromic image display 12 will always be visible; the first and second image displays 12 and 14 will be visible when the beverage and the thermochromic device 10 are cold, namely below 45 degrees; and the first, second, and third image displays 12, 14, and 16 will be visible when the beverage and the thermochromic device 10 are very cold, namely below 40 degrees.

Figure 11:
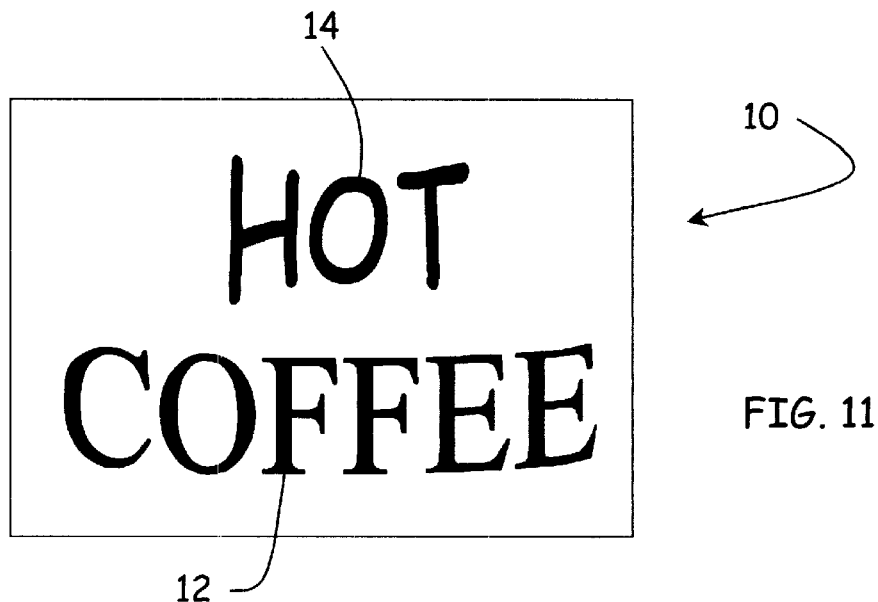
FIG. 11 is a view in front elevation of an alternative embodiment of the invention in a first temperature condition.
Figure 12:
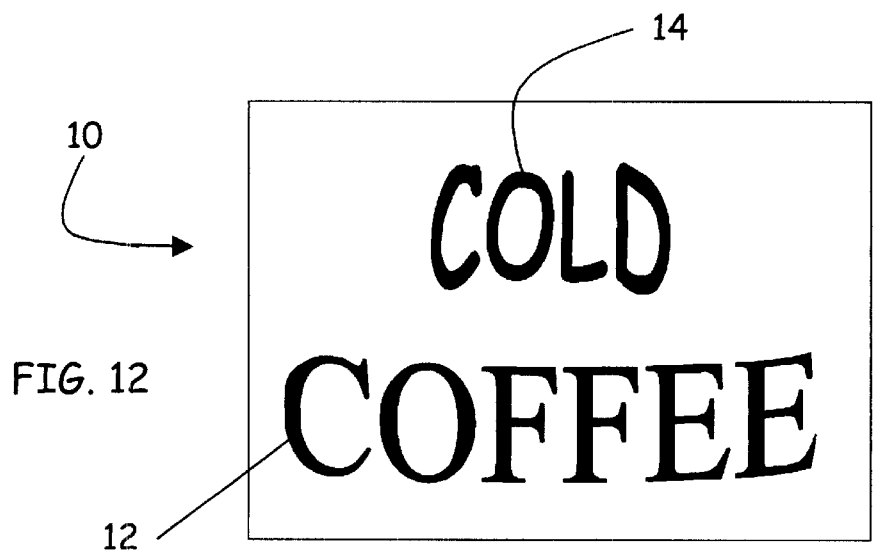
FIG. 12 is a view in front elevation of the embodiment of the invention of FIG. 11 in a second temperature condition.

One should again note that the temperature ranges set forth above are exemplary only. The active temperature ranges can be varied based on the liquid to be retained, consumers' expected desires, and a number of other factors. For example, thermochromic devices 10 for use with beverages best served hot could have image displays with active temperature ranges well above room temperature. Still further, uniquely advantageous thermochromic devices 10 could be created with one or more thermochromic image displays having active temperature ranges well above room temperature and with one or more thermochromic image displays having active temperature ranges well below room temperature. This still more unique thermochromic device 10 could be used relative to beverages, such as coffee, that could be served iced just as well as hot. Such a device 10 is shown in FIGS. 11 and 12 where the first image display 12, which depicts the word "COFFEE," is again non-thermochromic. However, in this case, the second image display 14, which depicts the word "HOT," is calibrated to have an active temperature range over which it will be visible that is well above room temperature wherein hot coffee is best served. The third image display 16, which depicts the word "COLD," is calibrated to have an active temperature range over which it will be visible that is well below room temperature wherein iced coffee is best served. Under this arrangement, the word "COFFEE" will always be visible, the word "HOT" will be visible only when the thermochromic device 10 is in the high active temperature range of the second image display 14, and the word "COLD" will be visible only when the thermochromic device 10 is in the low active temperature range of the third image display 16. As one will appreciate, this embodiment of the invention further shows that the image displays 12, 14, and 16 can overlap and need not necessarily be applied to physically distinct areas of the thermochromic device 10.

One should be aware that the thermochromic device 10 could be employed relative to product containers other than the illustrated beverage container 100. For example, the thermochromic device 10 could be employed relative to other consumer product containers including soup containers and any other container that retains a product the temperature of which may be desirable to ascertain. The beverage containers 100 shown in each of the preferred embodiments herein are merely exemplary.

Of course, one will further appreciate that the present invention is neither limited relative to the number of image displays nor relative to the breadth of their active temperature ranges. Accordingly, it will be clear that just one image display could be provided either to a single side of room temperature or to both sides of room temperature. It will be equally clear that a plurality of image displays with distinct or overlapping active temperature ranges could be provided to both sides of room temperature whereby a liquid could be indicated to be warm, hot, or very hot or to be cool, cold, or very cold. Yet further, one should be aware that the image displays 12, 14, 16, and possibly others need not explicitly denote temperature. Instead, they could take the form of decorative displays that may or may not connote temperature conditions. By way of example, displays indicative of holidays, seasons, promotions, games, advertisements, or the like could be provided.

Figure 7:
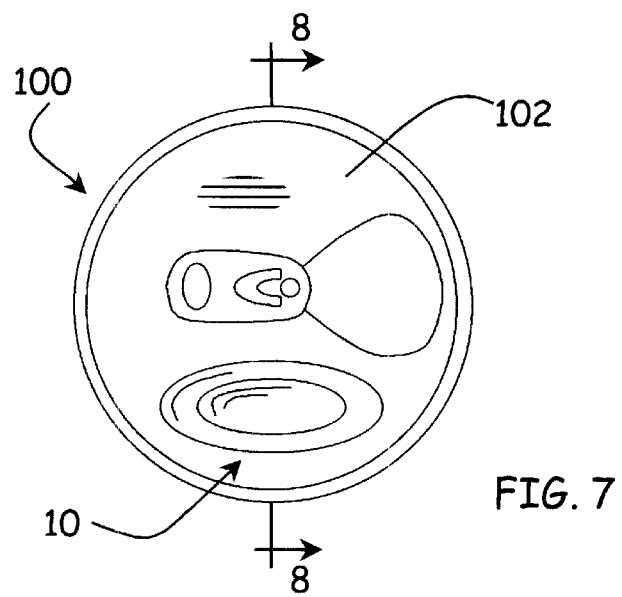
FIG. 7 is a top plan view of a beverage can top incorporating a thermochromic device according to the present invention.
Figure 8:
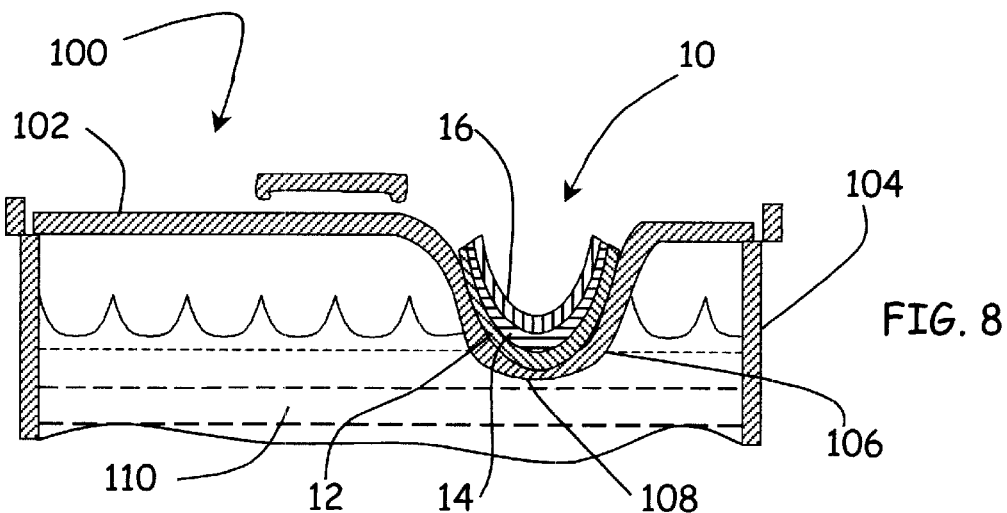
FIG. 8 is a cross sectional view of the beverage can top of FIG. 7.
Figure 9:
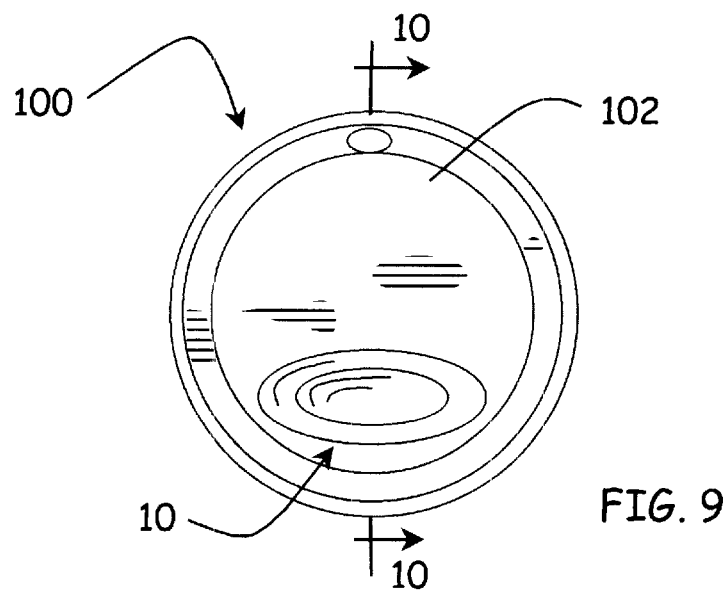
FIG. 9 is a top plan view of a cup lid incorporating a thermochromic device according to the present invention.
Figure 10:
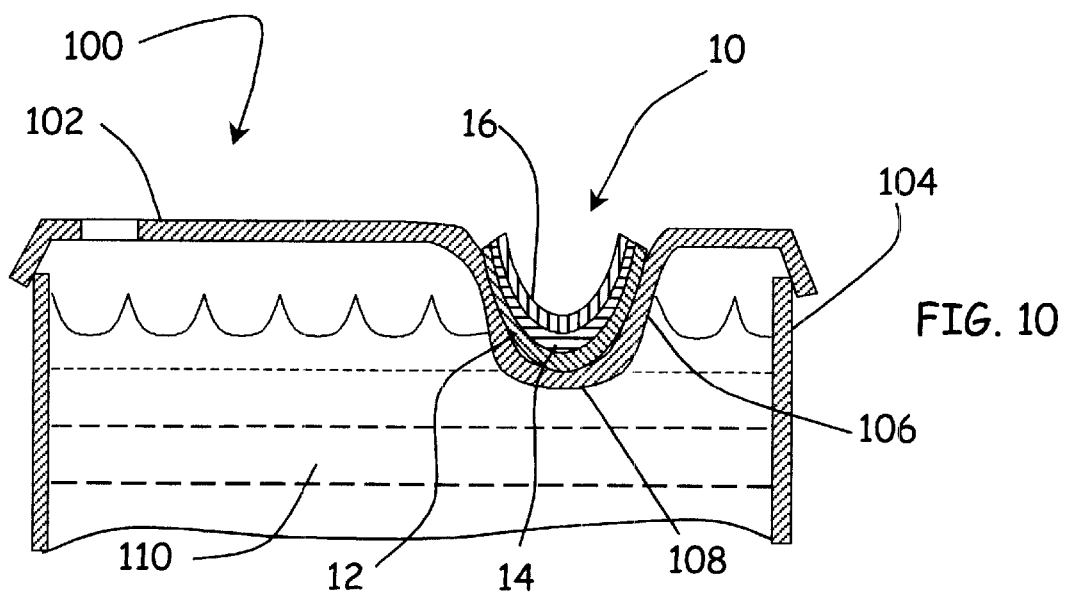
FIG. 10 is a cross sectional view of the cup lid of FIG. 9.

The breadth and applicability of the present invention are even more clearly shown in FIGS. 7 through 10 where the thermochromic device 10 is shown applied to the upper surface 102 of the container 100, which may be a beverage container 100, as compared to the side wall 104 to which it was applied in FIGS. 1–6. FIGS. 7 and 8 show the thermochromic device 10 employed relative to a can-type beverage container 100, and FIGS. 9 and 10 show the thermochromic device 10 employed relative to a removable lid 102, which could be used on a coffee cup, a soup bowl, or the like. In each case, the thermochromic device 10 is applied to a depression 106 in the upper surface 102 of the beverage container 100. Each depression 106 has a base 108 that is calculated to dip into a volume of liquid or product 110 that is retained by the container 100. First, second, and third image displays 12, 14, and 16 are applied to the depression 106 with the third image display 16 applied above the second image display 14 and the second image display 14 above the first image display 12.

In the preferred embodiment of FIGS. 7 and 8, where the thermochromic device 10 is shown applied to a can-type beverage container 100, the first image display 12 could be a non-thermochromic layer of ink or the like that would be constantly opaque. The second image display 14 could be a layer of thermochromic material calibrated to have an active temperature range wherein it will become opaque that is within a preferred temperature range for consuming cold beverages, such as between 33 and 45 degrees Fahrenheit. The third image display 16 could also be a layer of thermochromic material, but it could be calibrated to have an active temperature range wherein it will become opaque that spans a lower portion of the preferred temperature range for consuming cold beverages, such as between 33 and 40 degrees Fahrenheit.

To facilitate the present discussion, one can imagine the first image display 12 to be red in color, the second image display 14 to be blue in color when opaque, and the third image display 16 to be white in color when opaque. Under this arrangement, when the retained beverage 110 is warm (i.e., above 45 degrees), a prospective consumer will be apprised of this by the thermochromic device 10, which will show as red. When the retained beverage 110 is chilled to between 40 and 45 degrees, the second image display 14 will become opaque thereby obscuring the first image display 12. With this, the prospective consumer will be informed that the retained beverage 110 is between 40 and 45 degrees because the thermochromic device 10 will show is blue. Finally, when the retained beverage 110 is further chilled to between 33 and 40 degrees, the third image display 16 will become opaque thereby obscuring the first and second image displays 12 and 14 and displaying a white color to the consumer, who will then know that the beverage is between 33 and 40 degrees.

Of course, as FIGS. 9 and 10 indicate, this unique concept can be employed relative to beverages or other products, such as coffee or soup, that are commonly consumed well above room temperature. In FIGS. 9 and 10, the thermochromic device 10 again could have first, second, and third image displays 12, 14, and 16. The first image display 12 could be non-thermochromic and could be blue in color. With this, the first image display 12 would be constantly opaque and, when visible, would apprise a consumer that the retained product 110 is not in a heated condition. The second image display 14 could be thermochromic and calibrated to depict a pink color over a certain temperature above room temperature to indicate to a consumer that the retained product 110 is in a warmed condition. Finally, the third image display 16 could be thermochromic and calibrated to show as red when heated beyond a given temperature that is hotter than the temperature at which the second image display 14 becomes opaque. With this, a user could be apprised as to whether the retained product 110 is not warm, warm, or potentially dangerously hot.

Even further still, it would also be within the scope of the invention to create a thermochromic device 10 for use in the upper surface 102 of a container 100 that can be used to indicate whether a retained product is hot, cold, or in between. FIGS. 9 and 10 could depict such an embodiment. There, the first image display 12 could be non-thermochromic and could display the color white to indicate that the retained product 110 is neither hot nor cold. The second image display 14 could be thermochromic and calibrated to become visible and to display the color red when heated above a certain temperature. Lastly, the third image display 16 could be thermochromic and calibrated to become visible and to display the color blue when cooled below a certain temperature. With this, the thermochromic device 10 could be used relative to a hot product, such as hot coffee or soup, to indicate whether it is in an ideally hot condition for consumption, and it could be used relative to a cold product, such as iced coffee, to indicate whether it is in an ideally cold condition for consumption.

From the foregoing, it will be clear that the present invention has been shown and described with reference to certain preferred embodiments that merely exemplify the broader invention revealed herein. Certainly those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

What is claimed is:

1. A thermochromic device for use relative to a product container that provides a thermochromic indication of a temperature of a volume of product that is retained within an open inner volume of the product container, the thermochromic device comprising:
   a first image display for displaying a given first image;
   a second image display for displaying a given second image wherein the second image display comprises a layer of thermochromic material with an active temperature range over which the second image becomes visible;
   at least an upper surface of a product container wherein the upper surface has a top side and a bottom side;
   a depression in the top side of the upper surface of the product container;
   wherein the depression projects beyond at least an adjacent portion of the bottom side of the upper surface;
   wherein the first and second image displays are applied to the upper surface of the product container with the first and second image displays at least partially applied within the depression.

2. The thermochromic device of claim 1 wherein the upper surface of the product container comprises a top of a beverage can.

3. The thermochromic device of claim 2 further comprising an entire body of a beverage container in the form of a beverage can.

4. The thermochromic device of claim 1 wherein the upper surface of the product container comprises a lid of a product container.

5. The thermochromic device of claim 4 further comprising a product container wherein the lid is removably engageable with the product container.

6. The thermochromic device of claim 1 wherein the depression is configured to dip below the bottom side of the upper surface and physically into a volume of product that is retained within the open inner volume of the product container.

7. The thermochromic device of claim 1 wherein the second image display has an active temperature range above room temperature.

8. The thermochromic device of claim 1 wherein the second image display has an active temperature range below room temperature.

9. The thermochromic device of claim 1 wherein the thermochromic material comprises thermochromic liquid crystal material.

10. The thermochromic device of claim 1 wherein the thermochromic material comprises thermochromic ink material.

11. The thermochromic device of claim 1 wherein the first image display is a non-thermochromic display whereby the first image is constantly opaque.

12. The thermochromic device of claim 11 further comprising a third image display for displaying a third image wherein the third image display comprises a layer of thermochromic material with an active temperature range over which the third image becomes visible.

13. The thermochromic device of claim 12 wherein the second and third image displays have active temperature ranges that are below room temperature wherein at least a portion of the active temperature range of the third image display is below at least a portion of the active temperature range of the second image display whereby the second image display can provide an indication of when the thermochromic device is cooled to within the active temperature range of the second image display and whereby the third image display can provide an indication of when the thermochromic device is further cooled to within the active temperature range of the third image display.

14. The thermochromic device of claim 12 wherein the second and third image displays have active temperature ranges that are above room temperature wherein at least a portion of the active temperature range of the third image display is above at least a portion of the active temperature range of the second image display whereby the second image display can provide an indication of when the thermochromic device is heated to within the active temperature range of the second image display and whereby the third image display can provide an indication of when the thermochromic device is further heated to within the active temperature range of the third image display.

15. The thermochromic device of claim 12 wherein the second image display has an active temperature range that is below room temperature and the third image display has an active temperature range that is above room temperature whereby the second image display can provide an indication of when the thermochromic device is cooled to within the active temperature range of the second image display and whereby the third image display can provide an indication of when the thermochromic device is warmed to within the active temperature range of the third image display.

16. The thermochromic device of claim 1 wherein the first image display comprises a layer of thermochromic material applied directly to the upper surface of the product container with an active temperature range over which the first image becomes visible.

17. The thermochromic device of claim 16 wherein the first and second image displays have active temperature ranges that are below room temperature wherein at least a portion of the active temperature range of the second image display is below at least a portion of the active temperature range of the first image display whereby the first image display can provide an indication of when the thermochromic device is cooled to within the active temperature range of the first image display and whereby the second image display can provide an indication of when the thermochromic device is further cooled to within the active temperature range of the second image display.

18. The thermochromic device of claim 16 wherein the first and second image displays have active temperature ranges that are above room temperature wherein at least a portion of the active temperature range of the second image display is above at least a portion of the active temperature range of the first image display whereby the first image display can provide an indication of when the thermochromic device is heated to within the active temperature range of the first image display and whereby the second image display can provide an indication of when the thermochromic device is further heated to within the active temperature range of the second image display.

19. The thermochromic device of claim 16 wherein the first image display has an active temperature range that is below room temperature and the second image display has an active temperature range that is above room temperature whereby the first image display can provide an indication of when the thermochromic device is cooled to within the active temperature range of the first image display and whereby the second image display can provide an indication of when the thermochromic device is warmed to within the active temperature range of the second image display.

* * * * *